United States Patent
Suzuki

(10) Patent No.: US 10,641,238 B2
(45) Date of Patent: May 5, 2020

(54) WATER TURBINE DEVICE AND HYDRAULIC POWER GENERATION DEVICE

(71) Applicant: NTN Corporation, Osaka (JP)

(72) Inventor: Masahiko Suzuki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/086,679

(22) PCT Filed: Mar. 9, 2017

(86) PCT No.: PCT/JP2017/009621
§ 371 (c)(1),
(2) Date: Sep. 20, 2018

(87) PCT Pub. No.: WO2017/163919
PCT Pub. Date: Sep. 28, 2017

(65) Prior Publication Data
US 2019/0101097 A1    Apr. 4, 2019

(30) Foreign Application Priority Data

Mar. 22, 2016  (JP) ................. 2016-057248
Mar. 22, 2016  (JP) ................. 2016-057264

(51) Int. Cl.
| | |
|---|---|
| F03B 13/00 | (2006.01) |
| H02P 9/04 | (2006.01) |
| F03B 17/06 | (2006.01) |
| F03B 13/08 | (2006.01) |
| F03B 13/10 | (2006.01) |

(52) U.S. Cl.
CPC .......... F03B 17/061 (2013.01); F03B 13/083 (2013.01); F03B 13/10 (2013.01);
(Continued)

(58) Field of Classification Search
CPC .. F03B 3/04; F03B 13/08; F03B 13/10; F03B 17/06; F03B 17/061; F03B 7/00; Y02E 10/28; Y02E 10/223
See application file for complete search history.

(56) References Cited

U.S. PATENT DOCUMENTS 4,722,665 A * 2/1988 Tyson ................. F03B 3/04
                                                                  415/7
8,466,574 B2 * 6/2013 Bear .................. F03B 13/264
                                                                   290/53
(Continued)

FOREIGN PATENT DOCUMENTS

| | | |
|---|---|---|
| JP | 2003-106247 A | 4/2003 |
| JP | 3147950 U | 1/2009 |

(Continued)

OTHER PUBLICATIONS

International Search Report for corresponding International App. No. PCT/JP2017/009621, dated May 30, 2017.

*Primary Examiner* — Tulsidas C Patel
*Assistant Examiner* — Thomas K Quigley
(74) *Attorney, Agent, or Firm* — Renner, Otto, Boisselle & Sklar, LLP

(57) ABSTRACT

A water turbine device is provided which can move a water turbine from a use position to a nonuse position with a light force, and which has a simplified structure. An intermediate portion of a suspension support rod for suspending a water turbine immersed in a flowing water in a waterway is pivotally attached to a platform provided on the waterway with a horizontal shaft, and a power generation device as a balance weight is provided at the free end of the suspension support rod, and the water turbine is rotatable around the horizontal shaft between the use position where the water turbine is immersed in a flowing water and the nonuse position above the flowing water.

4 Claims, 8 Drawing Sheets

(52) U.S. Cl.
CPC ..... *F05B 2220/32* (2013.01); *F05B 2220/706* (2013.01); *F05B 2240/90* (2013.01); *F05B 2240/916* (2013.01); *F05B 2240/97* (2013.01); *F05B 2260/5032* (2013.01); *Y02E 10/223* (2013.01)

(56) References Cited

U.S. PATENT DOCUMENTS

| | | | | |
|---|---|---|---|---|
| 8,911,207 | B1* | 12/2014 | Anderson, Jr. | F03B 13/264 |
| | | | | 416/142 |
| 2009/0134623 | A1* | 5/2009 | Krouse | F03B 13/08 |
| | | | | 290/43 |
| 2010/0176595 | A1* | 7/2010 | Bear | F03B 13/264 |
| | | | | 290/53 |
| 2012/0119499 | A1* | 5/2012 | Kato | F03B 17/063 |
| | | | | 290/52 |
| 2015/0369207 | A1* | 12/2015 | Cinque | F03B 17/061 |
| | | | | 290/54 |
| 2018/0238297 | A1* | 8/2018 | Cinque | F03B 17/061 |
| 2019/0195187 | A1* | 6/2019 | Suzuki | F03B 11/00 |

FOREIGN PATENT DOCUMENTS

| | | |
|---|---|---|
| JP | 3160105 U | 6/2010 |
| JP | 2014-058944 A | 4/2014 |
| JP | 2014-101684 A | 6/2014 |
| JP | 2015-14219 A | 1/2015 |
| WO | 2011/010675 A1 | 1/2013 |

\* cited by examiner

WATER TURBINE DEVICE AND HYDRAULIC POWER GENERATION DEVICE

TECHNICAL FIELD OF THE INVENTION

The present invention relates to a water turbine device in which a water turbine is movable to a use position immersed in a waterway and a nonuse position above the waterway, and a hydraulic power generation device excellent in workability of installation and maintenance after the installation.

BACKGROUND OF THE INVENTION

In the conventional water turbine device, there is a water turbine device that a water turbine can be movable to a use position in which all or a part of the water turbine is immersed in a waterway and a nonuse position above the waterway, and when inspecting or repairing the water turbine, or when flooding of the waterway, etc., the water turbine can be pulled up to the nonuse position (See JP 2015-14219A, JP 2014-101684A, and JP No. 2014-58944A).

Also, as a hydraulic power generator suspended in a water channel, a water turbine is generally suspended in a suspension beam transversely extending between both banks of the water channel. In this case, a suspension work of the water turbine on a waterway is involved difficulty in topography. For example, a structure in which a water turbine is hung with a wire and moved up and down is described in JP 2015-14219A.

SUMMARY OF THE INVENTION

According to the invention described in JP 2015-14219A, a weight cradle is provided at the tip of a wire for lifting the water turbine, and a weight is sequentially piled on the weight cradle, or in a weight receiving container instead of the weight cradle, water as a weight that replaces the weight cradle is poured in, so that the water turbine is lifted. Hence, the work of attaching and detaching the weight to and from the weight cradle becomes hard work, or a water supply means is required, so that the whole apparatus becomes large.

Further, according to the method described in JP 2015-14219A, one support pole is provided on a horizontal beam installed on a waterway and a pulley is attached to the support pole, another support pole is installed at a position separated from the one support pole and another pulley is attached to the another support pole, a wire is wound between two pulleys, the front end of the wire is connected to the upper end of the hanger column of the water turbine, the weight is arranged at the rear end of the wire, and the water turbine is hung on the pulley.

However, in this case, the attachment work of pulleys is troublesome, and the work of lowering the water turbine into the water is not easy. Furthermore, it is difficult to draw the water turbine onto the horizontal beam.

According to the invention described in JP 2014-101684A, since the water turbine is raised or lowered by rotating a ratably operating handle of a water turbine positioning mechanism or by driving a motor, so that, in the case of rotating the handle, it is required labor, and in the motor drive type, the structure becomes complicated and a power supply means is required.

According to the invention described in JP No. 2014-58944A, a support arm is pivotally supported at one end by a support base, and a water turbine partially immersed in water of a waterway is pivotally supported to the other end of the support arm. When the water level of the waterway varied, since the immersion depth of the water turbine is maintained constant by the buoyancy of the water turbine itself due to the rotation of the support arm, so that even when the water level of the waterway fluctuates, it is possible to carry out power generation with the water turbine steadily.

However, JP No. 2014-58944A does neither mention nor suggest anything about inspecting or repairing, etc. of the water turbine by moving the water turbine to the nonuse position above the waterway.

Also, according to the device described in JP No. 2014-58944A, it is assumed that considerable labor is required to move the water turbine to the nonuse position above the waterway.

In view of the above problems of the prior art, an object of the present invention is to provide a water turbine device capable of moving lightly from the use position to the nonuse position of the water turbine and simplifying the structure of the water turbine device.

In addition, another object of the present invention is to provide a hydroelectric power generation device which makes it easier to suspend a water turbine, and furthermore, facilitating to pull the water turbine above the water surface and make easier of maintenance management.

According to the present invention, the above problems are solved as follows.

(1) An intermediate portion of a suspension support rod for suspending a water turbine that can be immersed in a flowing water in a waterway is pivotally attached to a platform provided on the waterway with a horizontal shaft, and a balance weight is provided at the free end of the suspension support rod, and the water turbine is rotatable around the horizontal shaft between a use position where the water turbine is immersed in the flowing water in the waterway and a nonuse position above the flowing water in the waterway.

According to such a configuration, with a simple structure, the water turbine can be moved lightly from the use position to the nonuse position, and it is possible to inspect or repair the water turbine in the nonuse position of the water turbine.

(2) In the above item (1), the balance weight is a power generation device connected to the water turbine via a power transmission means provided in the suspension support rod for generating electric power by the rotational force of the water turbine.

According to such a configuration, since the power generation device that generates electric power by the rotational force of the water turbine also serves as the balance weight, it is not necessary to prepare an exclusive balance weight.

(3) In the above items (1) or (2), in a state where the water turbine is located at the nonuse position, a fixing means for fixing either one of the suspension support rod, the balance weight, or the water turbine to the platform.

According to such a configuration, since when the water turbine located at the nonuse position, it is possible to fix the water turbine to the platform certainly, so that inspection or repair of the water turbine can be conducted safely.

(4) In the above item (1) or the above item (3) citing the item (1), the balance weight is detachably attached to the suspension support rod, or the balance weight and a part of the suspension support rod are detachably attached to the other part of the suspension support.

With such a configuration, since the balance weight can be removed from the suspension support rod in a state where the water turbine is in the use position or in the nonuse position, so that the balance weight does not interfere with the work during the water turbine is in use or during the repairing work.

(5) In a hydroelectric power generation device, an upper part of a suspension support body fixed to an upper surface of a water turbine housing is hung and fixed vertically through a horizontal hanging shaft between a pair of left and right shaft supports on a support base provided on a waterway, and the water turbine housing can be rotatable around the hanging shaft and can be pulled up onto the support base.

According to such a configuration, since the upper part of the suspension support body fixed to the upper surface of the water turbine housing is hung on the shaft supports via the horizontal hanging shaft, installation of the water turbine is easy.

Also, since the water turbine housing can be rotated and pulled up on the water channel with the horizontal hanging shaft as a fulcrum, maintenance and management of the water turbine are easy.

(6) In the above item (5), a downward bearing groove is formed in the center part in the front and rear of an upper surface of the shaft supports, and the horizontal hanging shaft provided on an upper edge part of the suspension support body is configured to be inserted into the downward bearing groove from the top and supported therein.

According to such a configuration, since the downward bearing groove is formed in the center part in the front and rear of the upper surface of the shaft supports disposed on the pair of left and right on the suspension support body provided on the waterway, and the horizontal hanging shaft at the upper edge part of the suspension support body is configured to be inserted into the bearing groove from the top and supported therein, it is easy to hang the water turbine. It is also easy to remove or swing the water turbine housing.

(7) In the above item (5) or item (6), a hook for hanging the water turbine housing is formed on the upper surface of the suspension support body.

According to such a configuration, since the hook for hanging the water turbine housing is formed on the upper surface of the suspension support body, the water turbine housing can be moved by hanging the hook with a cable of a crane and move the water turbine housing or carry it by hanging a carrying bar in the hook with two or more people.

(8) In any one of the above items (5) to (7), a lever rod for swinging the water turbine housing around the horizontal hanging shaft is detachably mounted on the upper portion of the suspension support body.

According to such a configuration, since the lever rod for swinging the water turbine housing around the horizontal hanging shaft is detachably mounted on the upper portion of the suspension support body on the water turbine housing, so that the water turbine casing under the suspension support body can be lifted from underwater by swinging with the horizontal hoisting shaft as a fulcrum.

According to the present invention, it is possible to provide a water turbine device which can move the water turbine with light force from the use position to the nonuse position and can simplify the structure of the water turbine device.

In addition, according to the present invention, it is possible to provide a hydroelectric power generation device which is easy to suspend a water turbine and can pull the water turbine above the water surface to facilitate maintenance and management.

EMBODIMENTS OF THE INVENTION

Hereinafter, embodiments of water turbine device of the present invention are described with reference to the drawings.

Figure 1:
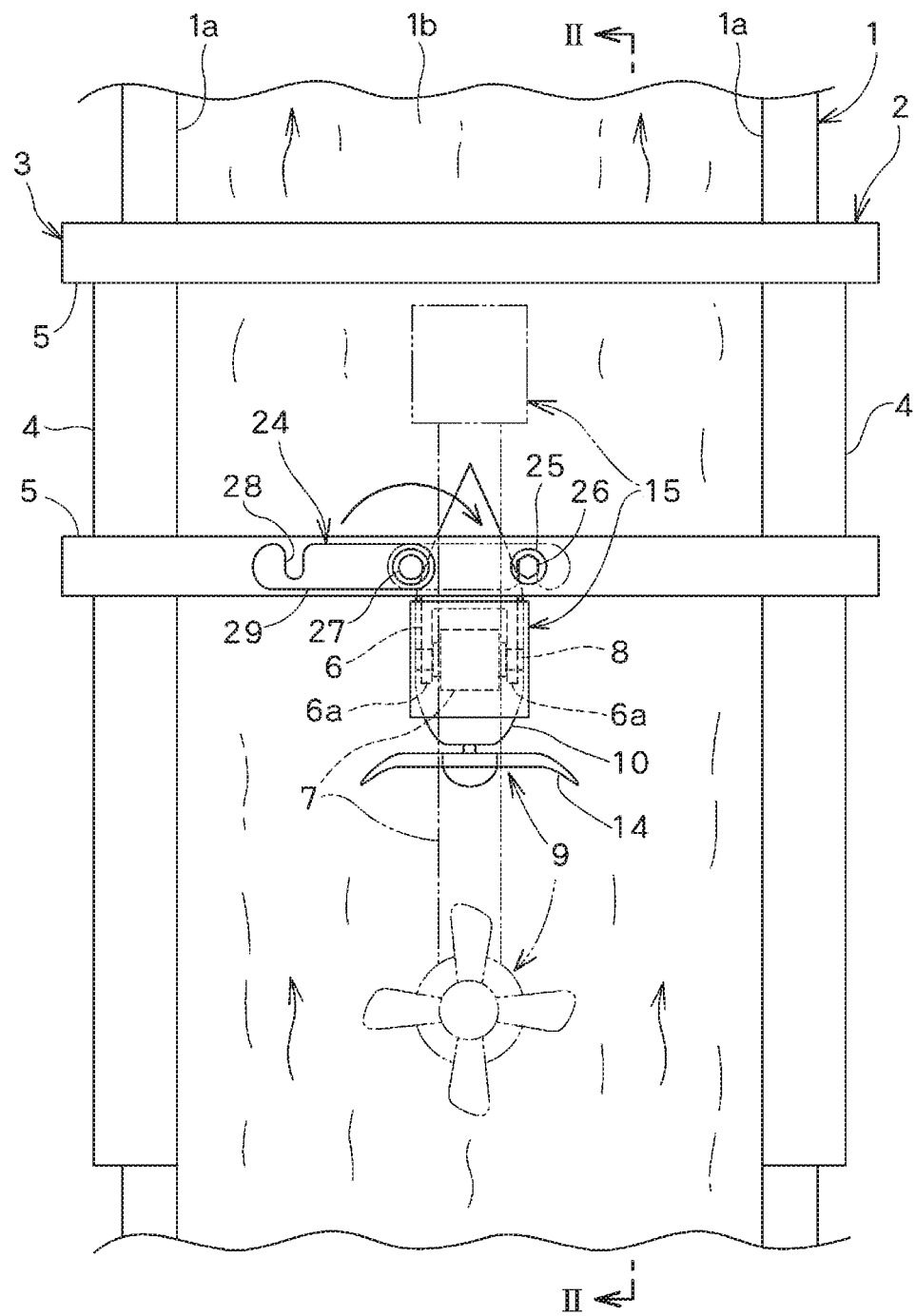
FIG. 1 is a plan view of a waterway in which a first embodiment of a water turbine device according to an embodiment of the present invention is installed.
Figure 2:
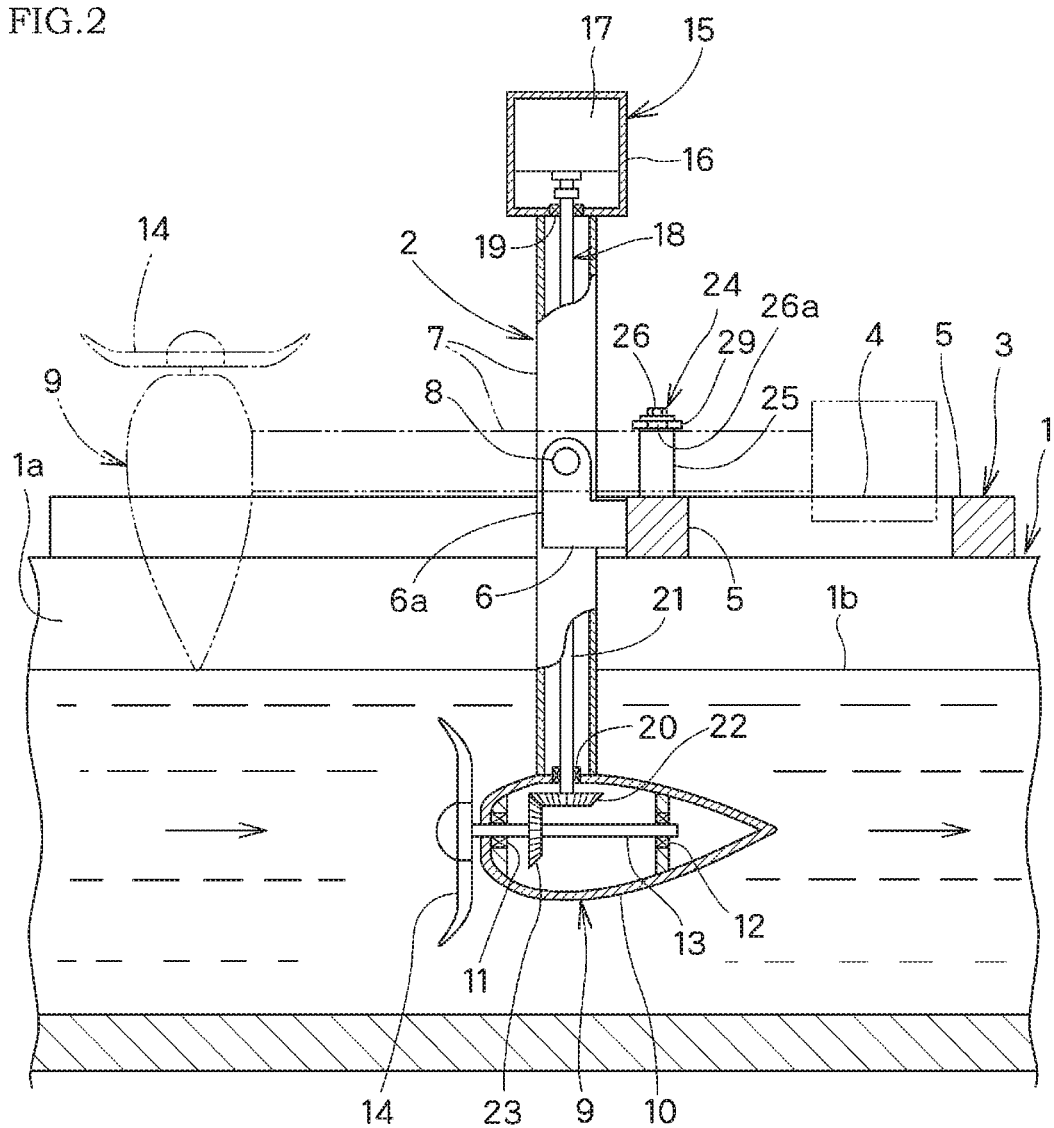
FIG. 2 is a longitudinal side view along line II-II of FIG. 1, shown partly broken away.

FIGS. 1 and 2 show a first embodiment of a water turbine device according to an embodiment of the present invention.

On the left and right side of walls 1a, 1a of the waterway 1, a platform 3 of the water turbine device 2 is provided. Note that the lower part of FIG. 1 and the left part of FIG. 2 are upstream of the waterway 1.

The platform 3 has a pair of left side and right side of rods 4, 4 provided on the left and right side of walls 1a, 1a, in parallel with the waterway 1, and a plurality of horizontal rods 5, 5 bridged over the left and right side rods 4, 4.

In the almost central portion in the left and right direction of the front surface of the front horizontal rod 5, a bracket 6 having a pair of right and left support pieces 6a, 6a is fixedly secured. Between those support pieces 6a, 6a, an intermediate portion of a vertically-oriented rectangular tubular suspension support rod 7 in the vertical direction is pivotally mounted with a horizontal shaft 8 facing left and right.

As shown in FIG. 2, at the lower end of the suspension support rod 7, a water turbine 9 is provided.

The water turbine 9 comprises a water-tight case 10, a water turbine shaft 13 pivoted rotatably by front and rear bearings 11, 12 in the case 10 and a front end of it is frontward from the front end of the case 10 in a watertight manner, and an impeller 14 fixed to the front end of the water turbine shaft 13 in front of the case 10.

At the upper end of the suspension support rod 7, a power generation device 15 serving also as a balance weight is provided.

The power generation device 15 includes a case 16 fixed to the upper end of the suspension support rod 7, and a power generator 17 accommodated in the case 16.

The power generator 17 is connected to the water turbine 9 by a power transmission means 18 provided in the suspension support rod 7 for generating electric power by the rotational force of the water turbine 9.

The power transmission means 18 is pivotally supported by bearings 19, 20 provided at the upper and lower ends of the suspension support rod 7. The power transmission means 18 comprises a transmission shaft 21 faces up and down direction and an upper end portion is connected to a rotor (not shown) of the power generator 17, a first bevel gear 22 fixedly fitted to the lower end portion of the transmission shaft 21 projected into the case 10 of the water turbine 9, and a second bevel gear 23 fixedly fitted in an intermediate portion of the water turbine shaft 13 in the case 10 of the water turbine 9 and meshes with the first bevel gear 22.

Therefore, when the water turbine 9 is immersed in the flowing water 1b in the waterway 1 and the impeller 14 and the water turbine shaft 13 are rotated by the flowing water 1b, the rotational force thereof is transmitted to the power generator 17 through the second bevel gear 23, the first bevel gear 22, and the transmission shaft 21 in this order, and the rotor of the power generator 17 is rotated by the rotational force thereof and generates electricity.

It is desirable to set that "the product of the mass of the entire power generation device 15 (which is also a balance weight) and the distance from the horizontal shaft 8 to the power generation device 15" and "the product of the mass of the entire water turbine 9 and the distance from the horizontal shaft 8 to the water turbine 9" are substantially equal.

In this way, by using the mass of the power generation device 15 as a balance weight and balancing with the weight of the water turbine 9, the water turbine 9 can be rotated with a light force, from the usage position of the water turbine where the water turbine is suspended from the suspension support rod 7 hanging from the horizontal shaft 8 as indicated by the solid line in FIGS. 1 and 2 and immersed in the water flow 1b of the waterway 1 to the nonuse position where the water turbine is above the water stream 1b of the waterway 1, indicated by the two-dot chain line in FIGS. 1 and 2, and vice versa.

By setting the water turbine 9 to the nonuse position, it is possible to easily inspect and repair the water turbine 9. Further, during flooding etc. of the waterway 1, by retracting the water turbine 9 to the nonuse position, it is possible to prevent the damage of the water turbine 9 at the time of the flood or the like in advance.

When the water turbine 9 is set to the nonuse position, the suspension support rod 7 is made substantially flat, but the position is not limited thereto. Further, when the water turbine 9 is set to the nonuse position, a portion of the suspension support rod 7 below the horizontal shaft 8 contacts with a stopper (not shown) provided on the bracket 6 and can be stopped.

For securely holding the water turbine 9 at the nonuse position, a fixing means 24 is provided for fixing either of the suspension support rod 7, the power generation device 15, or the water turbine 9 to the platform 3.

Here, the fixing means 24 comprises;

a pair of right and left protruding shafts 25, 25 provided on the upper surface of the front horizontal rod 5 of the platform 3 for sandwiching the suspension support rod 7 from the left and right side when it is set to the nonuse position, a flange bolt 26 screwed into a female threaded hole (not shown) provided at the upper end of one of the protruding shafts 25, and a locking rod 29 having one end which is hinged to the upper end of the other protruding shaft 25 with a headed pin 27 facing in the vertical direction, and an engaging groove 28 which can engage with and disengage from the shaft portion 26a of the flange bolt 26 is provided on the side edge of the other end portion.

The fixing means 24 may have other structures.

When the water turbine 9 and the suspension support rod 7 are located at positions other than the nonuse position, the locking rod 29 is positioned at the non-engagement position indicated by the solid line in FIG. 1.

By bringing the water turbine 9 and the suspension support rod 7 in the unused position, the suspension support rod 7 is contacted with the upper surface of the front horizontal rod 5. Then, the locking rod 29 is turned about 180 degrees around the headed pin 27 from a disengaged position to an engagement position shown by a two-dot chain line in FIG. 1. So that the engaging groove 28 is pivoted to the engagement position where the engaging groove 28 is engaged with the shaft portion 26a of the flange bolt 26. Then, the suspension support rod 7 is constrained by tightening the flange bolt 26, and the water turbine 9 can be stably held at the nonuse position.

According to the first embodiment, since the power generation device 15 is provided as a balance weight at the free end of the suspension support rod 7 with a simple structure, the water turbine 9 can be moved light force from the use position to the nonuse position, and the water turbine can be inspected or repaired while the water turbine 9 is in the nonuse position.

In addition, since the power generation device 15 that generates electric power by the rotational force of the water turbine 9 functions as a balance weight, there is no need to prepare a dedicated balance weight.

Further, in a state where the water turbine 9 is located at the nonuse position, there is provided the fixing means 24 for fixing either the suspension support rod 7, the power generation device 15 which is the balance weight, or the water turbine 9 to the platform 3, and the water turbine 9 can be securely fixed to the platform 3 in a state where the water turbine 9 is located at the nonuse position and the water turbine 9 can be safely inspected or repaired.

Figure 3:
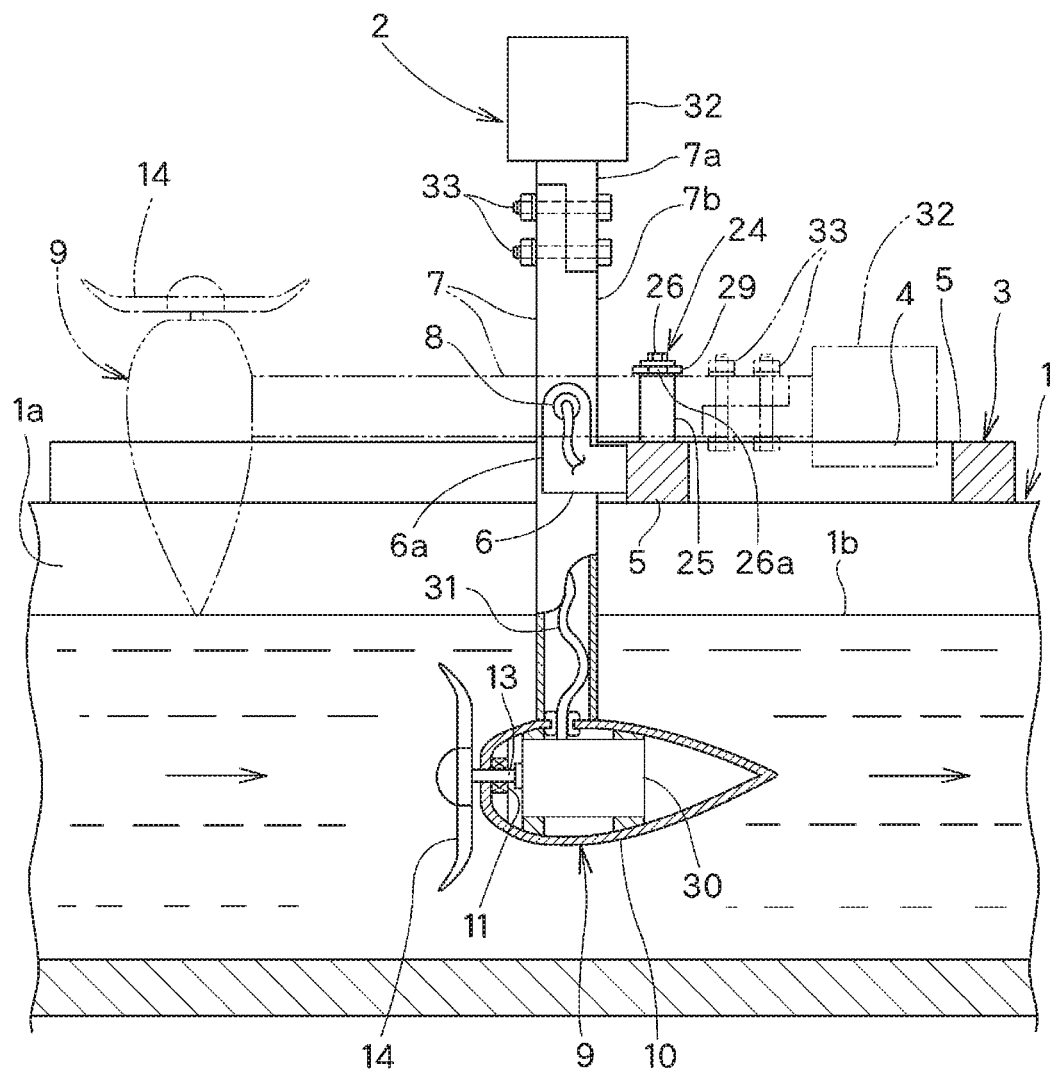
FIG. 3 is a longitudinal side view, in a waterway provided a water turbine device according to a second embodiment of the present invention, same way as FIG. 2.

FIG. 3 shows a second embodiment of the water turbine device according to the present invention. It is to be noted that the same or similar members as those in the first embodiment are denoted by the same numerals, and a detailed description thereof is omitted (Similar to the third embodiment).

In the second embodiment, a power generator 30 is built in the case 10 of the water turbine 9, the water turbine shaft 13 of the impeller 14 is directly connected to the power generator 30, and by rotation of the impeller 14 and the water turbine shaft 13, the rotor (not shown) of the generator 30 is directly rotated to generate electricity, and electric power generated by the power generator 30 is output from the power generator 30 through the suspension support rod 7 and the horizontal shaft 8 to the outside, and is supplied to a charging device (not shown) via a power supply line 31 connected to the charging device.

A simple balance weight 32 is provided at the free end of the suspension support rod 7, instead of the power generation device 15 in the first embodiment.

Further, by connecting an upper part 7a and another part 7b of the suspension support rod 7 with a halved joint and fixing the halved joint with two bolts and nuts 33, 33, so that the balance weight 32 and the upper part 7*a* of the suspension support rod 7 are detachably attached to the other part 7*b* of the suspension support rod 7.

Therefore, when the water turbine 9 is in the use position or in the nonuse position, by removing the bolts and nuts 33, 33, the balance weight 32 and the upper portion 7*a* of the suspension rod 7 can be removed from the other portion 7*b* of the suspension rod 7, so that the balance weight 32 does not interfere with the work.

Figure 4:
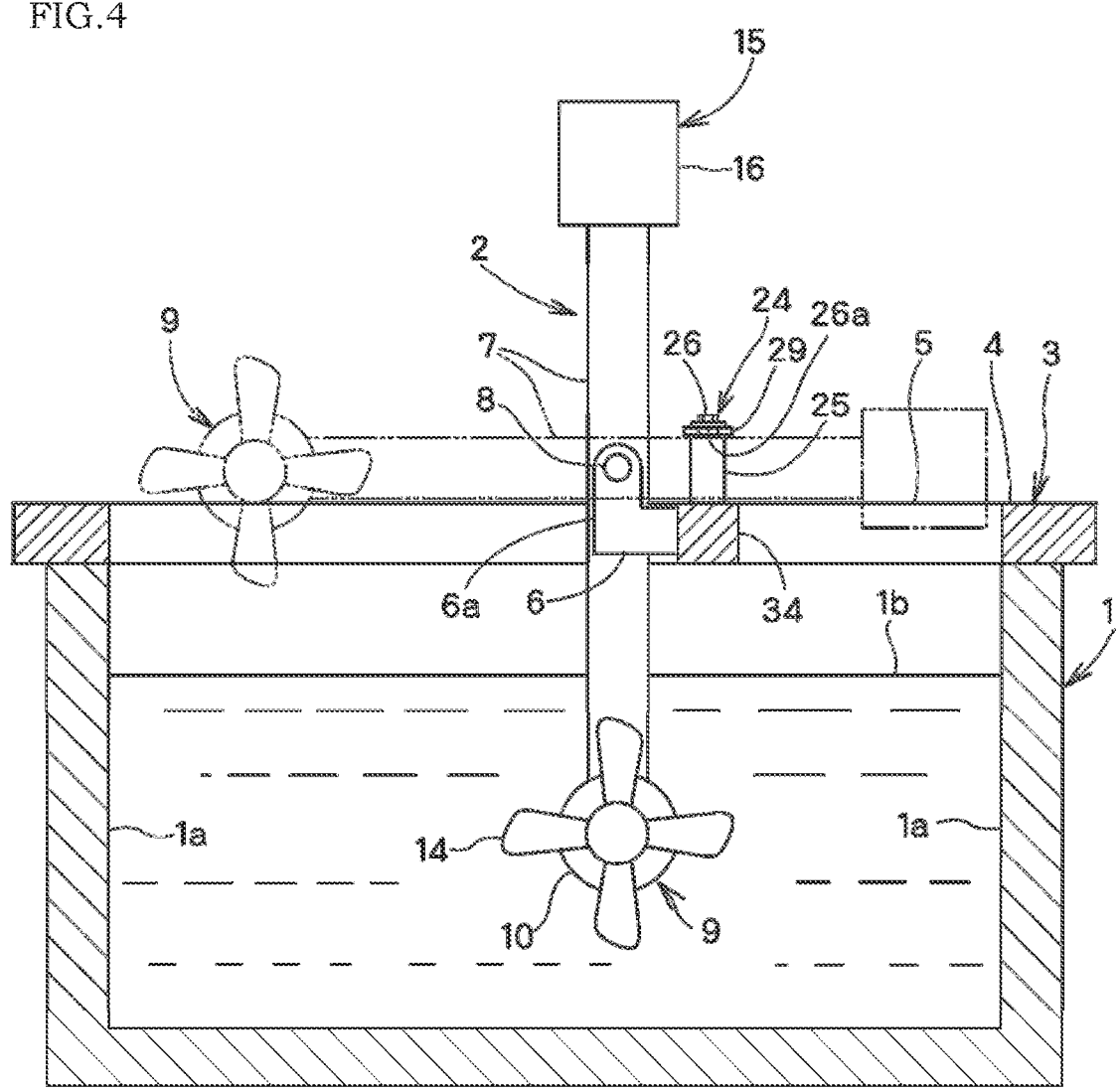
FIG. 4 is a vertical front view of a waterway where a water turbine device according to a third embodiment of the present invention is installed over the waterway.

FIG. 4 shows a third embodiment of the water turbine device according to the present invention.

According to the third embodiment, a connecting rod 34 is installed between the middle portions of the front and rear horizontal rods 5, 5 in the platform 3, and the horizontal shaft 8 for pivotally supporting the suspension support rod 7 is brought into parallel with the waterway 1 by the bracket 6 provided on the connecting rod 34. The suspension support rod 7 is configured rotatable around the horizontal shaft 8 from the use position facing upward and downward as shown by the solid line in FIG. 4 to the nonuse position oriented substantially horizontally in the left and right direction as indicated by a two-dot chain line in FIG. 4. Other configurations are the same as those of the first embodiment.

With such a configuration, according to the above first embodiment, it is necessary that the suspension support rod 7 must be rotated from the use position to the nonuse position against the flowing water 1*b* of the waterway 1, whereas, in this third embodiment, since the suspension support rod 7 can be rotated from the use position to the nonuse position while the water turbine 9 is laterally moved with respect to the flowing water 1*b* of the waterway 1, so that the resistance by the flowing water 1*b* can be reduced.

The water turbine device according to the present invention is not limited to embodiments described above, and can be implemented, for example, in the following modified form without departing from the scope of the claims.

(1) A working footplate (not shown) cut out of the range of rotation of the suspension support rod 7 and the water turbine 9 may be provided on the side rod 4 and the horizontal rod 5 of the platform 3.

(2) As the fixing means 24, instead of the locking rod 29 or the like, a locking means (not shown) may be provided for locking the power generation device 15 at the nonuse position to the rear horizontal rod 5.

(3) The balance weight 32 may be provided detachably on the upper end of the suspension support rod 7.

(4) the suspension support rod 7 may be rotated by power of a motor provided on the platform 3, via a gear (not shown) provided integrally with the suspension support rod 7 coaxially with the horizontal shaft 8 and a reduction gear (not shown) meshing with the gear, from the use position to the nonuse position, and in the reverse direction.

(5) The suspension support rod 7 may be rotated by a manual winch or electric winch from the use position to the nonuse position and in the reverse direction.

Next, a hydroelectric power generation device according to an embodiment of the present invention is described with reference to FIGS. 5 to 10.

Figure 5:
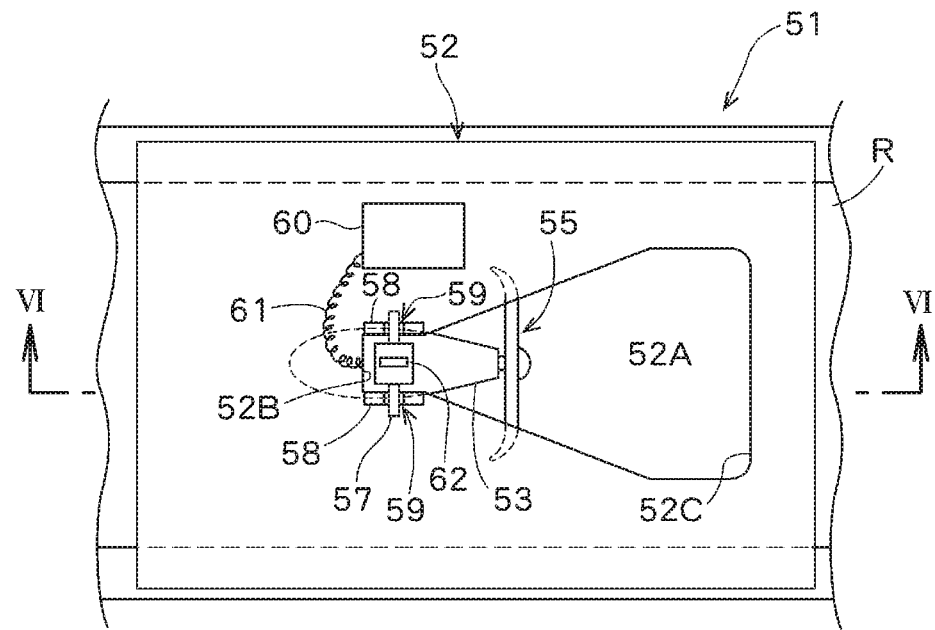
FIG. 5 is a plane view of a hydroelectric power generation device according to an embodiment of the present invention.
Figure 6:
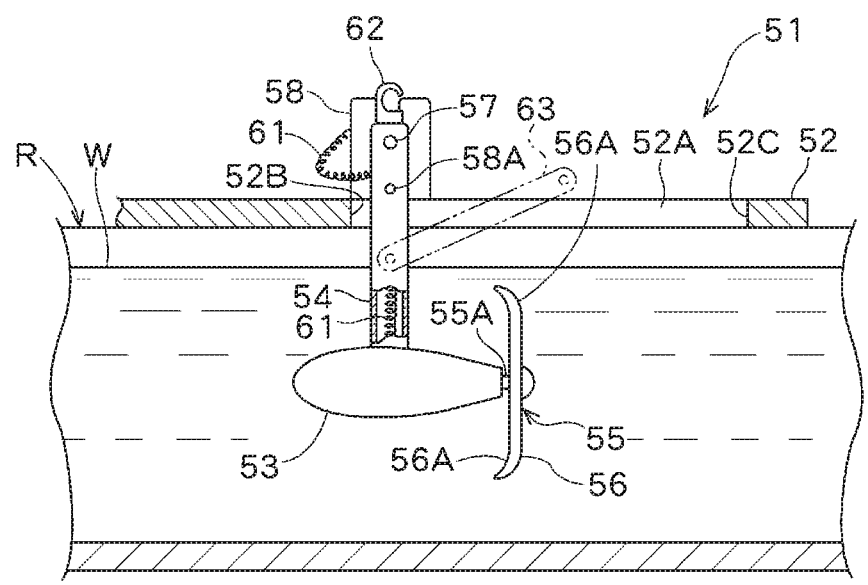
FIG. 6 is a longitudinal side view along line V1-V1 in FIG. 5.

As shown in FIGS. 5 and 6, a hydroelectric power generation device 51 is suspended on a support base 52 bridged over the upper edge of a water channel R.

The support base 52 is a rectangular plate-shaped member having a thickness capable of withstanding the weight of the water turbine and a person. A through hole 52A having a shape and dimension allowing passage of a water turbine housing 53 is bored at the central portion in the left-right direction of the support base. At an end portion on the upstream side of the through hole, an installation portion 52B capable of fitting a suspension support body 54 for suspending the water turbine housing 53 is provided.

A downstream side 52C of the through hole 52A is shaped and dimensioned to allow the rotor 55 to move in and out. The length from the installation portion 52B to the downstream side 52C is a length that the water turbine housing 53 is rotatable around a horizontal hanging shaft 57 provided at the upper end portion of the suspension support body 54 shown in FIG. 6 until the front end of the water turbine housing 53 comes out on the support 52.

A pair of left and right shaft supports 58, 58 are provided at the left and right of the installation portion 52B on the support base 52. In the center part in front and rear of the upper surface of the shaft support 58, U-shaped bearing grooves 59, 59 are formed so that the horizontal hanging shaft 57 of the suspension support body 54 is rotatably supported at the groove bottom of the bearing grooves.

Inside the water turbine housing 53, a power generator (not shown) is disposed, and the rear end portion of a rotor shaft 55A connected to a shaft of the power generator is protruded rearward from the water turbine housing 53 and a rotor 55 is fixed to the end portion of the shaft. The rotor 55 has a plurality of lifting type blades 56 fixed to the hub, and the blade tip of the blade 56 is formed as an inclined portion 56A which is inclined in the upstream direction.

On the upper surface of the water turbine housing 53, the suspension support body 54 of hollow shape is vertically fixed. An output cord 61 of the power generator (not shown) provided in the water turbine housing 53 passes through the interior of the suspension support body 54 and protrudes to the outside of the suspension support body 54 from the upper edge portion, and the tip of the output cord is connected to a storage battery 60 provided on the support 52.

The length of the suspended support body 54 is set to an appropriate length that allows the water turbine housing 53 to be disposed in the water in the water channel R to be installed, from the support base 52. The horizontal hanging shaft 57 projecting in the left-right direction is fixed to the upper edge portion of the suspension support body 54. A hook 62 for suspending the water turbine housing 53 is fixed to the upper end portion of the suspension support body 54.

After setting the support base 52 on the water channel R, the direction of the suspended support body 54 of the water turbine housing 53 placed near the water supply route R is changed upward, a wire for example is hooked on the hook 62 and is lifted with a crane, thereby, the water turbine housing 53 is moved to the through hole 52A. In the case where the water turbine housing 53 is small and lightweight, two persons can carry the water turbine housing by holding the hook 62 with a carrying bar (not shown).

Next, while lowering the water turbine housing 53 into the water from the through hole 52A, the suspension support body 54 is moved to the setting portion 52B. Then, the horizontal hanging shaft 57 provided on the upper edge portion of the suspended support body 54 is dropped into the U-shaped bearing groove 59 provided on the upper surface of the shaft support body 58, and the suspension support body 54 is fixed so as not to swinging by the fixing pin 58A of the shaft support body 58.

When the tip of the output cord 61 extending from the suspension support body 54 is connected to the storage battery 60 on the support base 52, and then, when the electromagnetic clutch (not shown) between the rotating shaft of the power generator inside the water turbine housing 53 and the rotor shaft 55A is operated, the power generator starts generating electricity as the rotor 55 rotates.

In this way, it is possible to easily arrange the water turbine housing 53 in the water channel R in a short time. Also, when maintenance and management of power generator etc. are carried out, by turning off the electromagnetic clutch (not shown) to stop power generation, then removing the fixing pin 58A of the shaft support 58, hooking the hook 62 and hanging it with the crane, the water turbine housing 53 can be pulled up on the support base 52 via the through hole 52A of the support base 52.

When the water turbine housing 53 is lightweight, two persons can pull up the water turbine housing by holding the hook 62 with a carrying bar (not shown). Since a force of the flowing water in the water channel R is exerted on the water turbine housing 53, it may be provided a fixing rod 63 as indicated by an imaginary line in FIG. 6 is inserted between the left and right of the suspension support body 54 and the support base 52.

Figure 7:
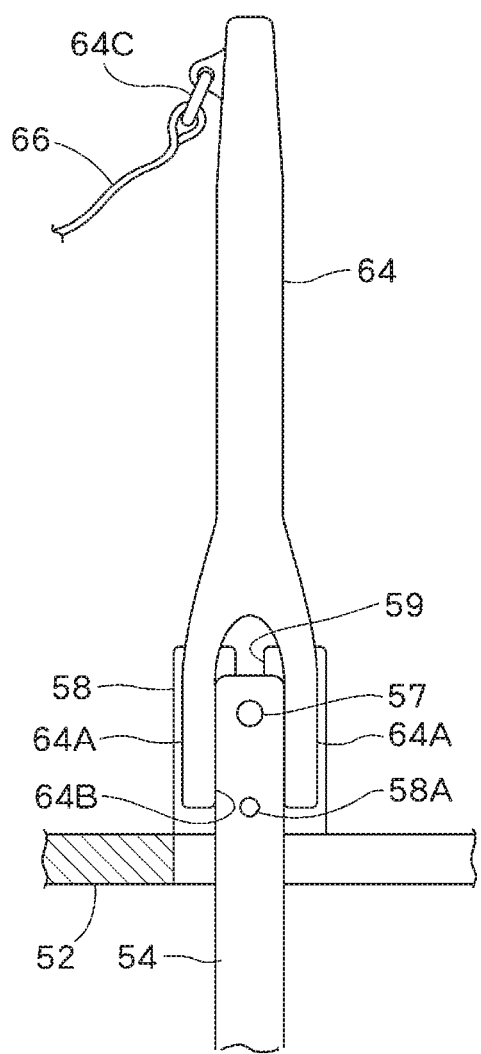
FIG. 7 is a side view in a state where a lever rod is attached to the upper part of a suspension support body in FIG. 5.

FIG. 7 is a side view showing a state in which a lever rod 64 is detachably attached to the upper portion of the suspending support 54. The lever rod 64 is longer than the height of the suspension support body 54, and a forked portion 64A having a clamp 64B that can be fitted onto the upper edge of the suspension support body 54 is formed at the lower portion thereof.

When the horizontal hanging shaft 57 of the suspension support body 54 is dropped into the bearing groove 59 of the shaft support body 58, since the water turbine housing 53 is pushed downstream by the water flow in the water channel R, therefore, while pulling the upper portion of the lever rod 64 to the right direction in FIG. 7, confirming the position of the fixing pin 58A, the suspension support body is fixed to the shaft support body. Thereafter, the lever rod 64 is removed and used in another place or stored.

Figure 8:
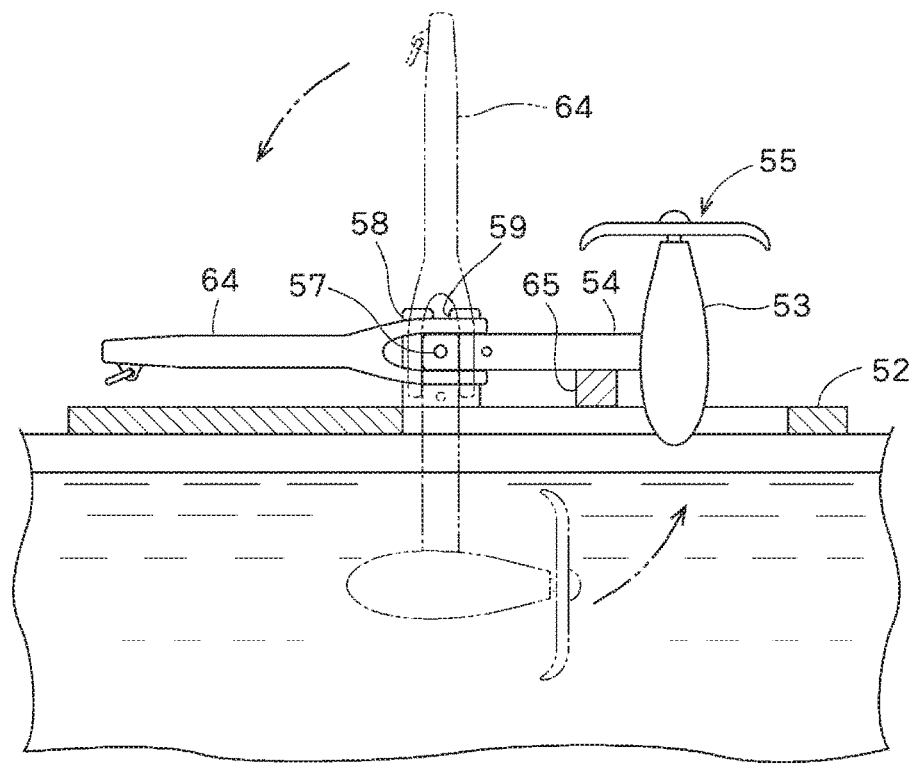
FIG. 8 is a side view in a state where the lever rod is tilt and the water turbine housing is pulled up.

When the fixing pin 58A is pulled out and the upper edge of the lever rod 64 is pushed down in the left direction in FIG. 7, the water turbine housing 53 can be pushed up onto the support base 52 with the horizontal hanging shaft 57 as a center, as shown in FIG. 8. Thereafter, as shown in FIG. 8, a jig 65 is horizontally placed above the through hole 52A of the support base 52 to support the suspension support body 54, and the maintenance/inspection of the inside of the water turbine housing 53 or the rotor 55 can be performed.

Figure 9:
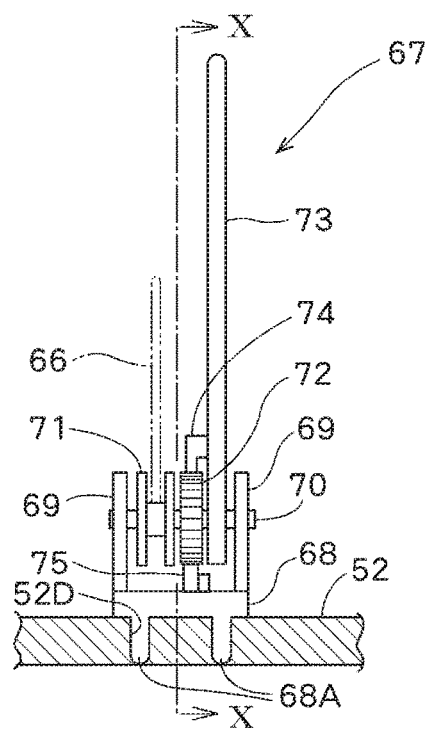
FIG. 9 is a rear view of a towing device for towing the lever rod.

FIG. 9 shows a towing device 67. In the towing device, a tow rope 66 one end of which is fixed to a tow rope attachment 64C at the upper edge portion of the lever rod 64 as shown in FIG. 7, so that, by towing the tow rope 66 and tilting the lever rod 64, the water turbine housing 53 is pulled up onto the support base 52.

A pair of shaft supports 69, 69 extending in vertical direction are set by detachably fitting a pair of fitting protrusions 68A protruded from the lower surface of a pedestal 68 of the towing device 67 into fitting holes 52D formed in the support base 52. Thereby, the towing device 67 can be fixed to the support base 52 as necessary. A winding wheel 71 for winding the tow rope 66 is rotatably mounted on a support shaft 70 horizontally mounted on the shaft supports 69.

A ratchet wheel 72 is coaxially fixed to the winding wheel 71. An actuating rod 73 is provided in the longitudinal direction coaxially and swingably in parallel with the ratchet wheel 72. A pushing pawl 74 is formed on the actuating rod 73, and the tip of the pushing pawl 74 is engaged with the pawl tooth 72A of the ratchet wheel 72. The ratchet wheel 72 can rotate one claw at a time by swinging back and forth of the actuating rod 73. The reverse rotation of the ratchet wheel 72 is prevented by a returning stopper pawl 75 provided on the pedestal 68.

If the lever rod 64 shown in FIG. 7 can't be tilted by a hand, the tow rope 66 is attached to the tow rope attachment 64C, and the distal end portion thereof is fixed to the winding wheel 71 in FIG. 9. Thereafter, by swinging the actuating rod 73 shown in FIG. 10 back and forth, so that the tow rope 66 can be wound around the winding wheel 71 by the ratchet mechanism.

As the tow rope 66 is wound around the winding wheel 71, the lever rod 64 in FIG. 7 gradually tilts to the left direction in FIG. 7, and the water turbine housing 53 in FIG. 6 rotates around the hanging shaft 57 as a fulcrum and rises above the support base 52. So that, the jig 65 shown in FIG. 8 can hold the suspension support body 54 on the support base 52, and maintenance or inspection of the inside of the water turbine housing 53 and the rotor 55 can be performed.

Figure 10:
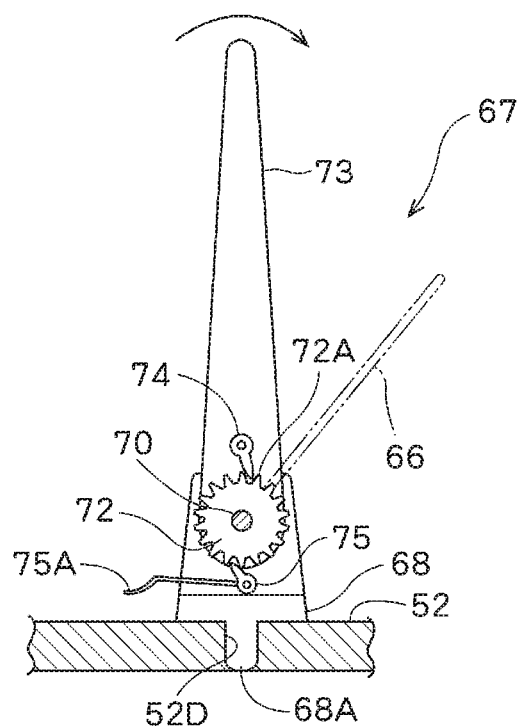
FIG. 10 is a longitudinal side view along line X-X in FIG. 9.

To return the water turbine housing 53 into the water, the pushing pawl 74 of the actuating rod 73 in FIG. 10 is retracted by one claw of the pawl tooth 72A of the ratchet wheel 72, and by pressing a pedal 75A of the returning stopper pawl 75, the ratchet wheel 72 rotates backward by one claw.

By continuing this operation continuously, the lever rod 64 in FIG. 7 can be returned to the upright direction, so that the water turbine housing 53 can be lowered gently and gradually settled in the water. Since the lever rod 64 and the towing device 67 can be carried to a work site, it is not necessary to install various devices at the installation site of the water turbine.

In the drawings, it is stated that the hydraulic power generator 51 is rotated in the upstream and downstream directions of the waterway, but it is natural that the hydroelectric power generator can be rotated in the waterway width direction in a place where the width of the waterway is wide.

INDUSTRIAL APPLICABILITY

Since the suspension support body formed on the upper surface of the water turbine housing is only hung on the shaft supports via the horizontal hanging shaft, so that the installation of the water turbine is easy, and it is also easy to pull up the water turbine from the water, thereby maintenance and management is easy, and a high use effect can be obtained in the hydroelectric power generation device in the water channel.

What is claimed is:
1. A hydroelectric power generation device comprising:
a support base that is bridged over upper edges of both sides of a water channel, wherein the support base is rectangular shaped;
a water turbine housing held on the support base and provided with a generator inside;
wherein the support base comprises:
a through hole provided in a central portion of the support base configured to allow the water turbine housing to pass through,
an installation portion provided at the upstream end of the through hole of the support base and capable of fitting with a suspension support body fixed to an upper surface of the water turbine housing, and
a downstream side portion provided on the downstream side of the through hole, wherein a rotor connected to a rotating shaft of the generator protrudes downstream from the water turbine housing, wherein the rotor has a plurality of lifting type blades, and the blade tip of the lifting type blade has an inclined portion inclined in an upstream direction, wherein the downstream portion of the through hole has a shape that allows the rotor to move in and out, wherein a pair of left and right shaft supports are provided upright at the left and right of the installation portion on the support base, wherein the water turbine housing is rotatably supported between the pair of left and right shaft supports through a horizontal hanging shaft provided on the upper part of the suspension support body, and wherein the length from the installation portion to the downstream side is a length that the water turbine housing is rotatable around the horizontal hanging shaft as a center and can be pulled up onto the support base.

2. The hydroelectric power generation device according to claim 1, wherein a U-shaped bearing groove is formed in the center part in the front and rear of an upper surface of the shaft supports respectively, and wherein the horizontal hanging shaft provided on an upper edge part of the suspension support body is configured to be inserted into the U-shaped bearing groove from the top and supported therein.

3. The hydroelectric power generation device according to claim 1, wherein on the upper surface of the suspension support body, a hook for hanging the water turbine housing is formed.

4. The hydroelectric power generation device according to claim 1, wherein on the upper portion of the suspension support body, a lever rod for swinging the water turbine housing around the horizontal hanging shaft is detachably mounted.

* * * * *